Patented June 11, 1935

2,004,514

UNITED STATES PATENT OFFICE 2,004,514

LACQUER ENAMEL

Henry W. Battle, Jr., Louisville, Ky.

No Drawing. Application December 21, 1932,
Serial No. 648,212

17 Claims. (Cl. 134—79)

This invention relates to the production of lacquers and has for an object the provision of improved lacquer products. More particularly, the invention contemplates the provision of a process for producing improved black lacquer enamels.

In the production of black lacquer enamels, it is customary to disperse finely divided solid black pigments in clear cellulose ester lacquer usually consisting of a solvent mixture, a cellulose ester, a plasticizer, and one or more resins. This mixture forms a product which will dry to a black opaque surface. Such products have good hiding power, but do not always possess the degree of blackness desired. Deeper black effects may be produced by employing soluble black dyes or tinting agents in conjunction with the solid black pigments. According to the heretofore customary practices, where it was found desirable to use soluble black dyes or tinting agents in conjunction with solid black pigments, such black dyes or tinting agents have had certain inherent disadvantages. Thus, for example, in order to render the enamel appreciably blacker, relatively large amounts of soluble black dyes or other soluble tinting agents have to be added to the enamel. When such an enamel is applied to a surface; and, after drying, a decorative stripe or lettering of a light colored lacquer enamel is applied, a tendency to bleed and thus discolor such decorations is noted. Furthermore, the general type of soluble dyes suitable for use in lacquer enamels are fugitive to long outside exposure when employed in the heretofore customary manner. It is difficult or impossible to form enamels of uniform and constant degrees of blackness by following the heretofore customary procedures. In many cases, only a temporary increase in the degree of blackness is achieved by the addition of soluble dyes or tinting agents. Because of the lack of uniformity of the products and the tendency of the products to vary in blackness, it is difficult to blend a patch to cover a spot from which the enamel has been removed, as is frequently required following sanding operations for removing irregularities from the surfaces of coated bodies or articles.

The present invention is based on my discovery that improved black lacquer enamel products may be obtained by subjecting black pigments, in finely divided condition, to the action of black dyes or other soluble tinting agents under such conditions that the dyes or tinting agents are incorporated in the pigments by adsorption on the surfaces of the particles of pigment or by forcing the dyes or tinting agents into the pores of the particles. The pigments are preferably subjected to the action of dye or tinting agent solutions under the influence of pressure or heat and pressure prior to the incorporation of the pigments in the final lacquer products.

Lacquer enamels produced in accordance with the method of my invention are many times blacker than lacquer enamels produced from the same formulæ according to the heretofore customary methods. I can achieve a greater degree of blackness by employing less than twenty per cent. of the amount of soluble dye or tinting agent employed heretofore in formulæ which are otherwise the same. Furthermore, lacquer enamels of extreme degrees of blackness produced in accordance with the method of my invention are not objectionable because of bleeding, and they possess an extreme degree of light fastness. Even in employing a dye or tinting agent such as nigrosine base which is recognized as being fugitive when exposed to the elements in lacquer enamels of the type produced heretofore, I can produce enamels having extreme degrees of light fastness by the method of my invention.

The degrees of blackness of lacquer enamels produced in accordance with the method of my invention can be controlled accurately, and products can be readily duplicated or made uniform. The lacquers of my invention may be employed to effect substantially perfect blending of patches which may be required when the surface of an article finished with lacquer of my invention is marred or sanded through during the finishing process.

Black lacquer enamels prepared in accordance with the process of my invention exhibit little or no tendency to settle when reduced with suitable lacquer thinners to proper spraying or dipping viscosities, whereas, lacquers produced by methods identical with my method, except for the addition of the small amount of dye or tinting agent, settle to a very appreciable degree within a few hours time.

In referring to black dye or black dyes throughout the specification and claims of this application, I intend to include all soluble coloring agents which may be employed in conjunction with solid black pigments to produce more desirable effects than can be achieved through the use of the solid black pigments alone.

According to the preferred complete process of my invention, a solution of a suitable black dye or tinting agent such, for example, as induline base, nigrosine base, or bone pitch, is mixed with a carbonaceous pigment—preferably a good grade of carbon black—a cellulose ester, a plasticizer and an alcohol. This mass should be well mixed in any suitable mixer such, for instance, as an airtight tumbling barrel; or, if preferred, it may be mixed through the use of a suitable type dough mixer. The product thus formed is run in convenient size batches through a mill suitable for plastic milling until the pigment is suitably ground and dispersed throughout the mass. There exists a similarity between mills used in several distinct industries that are suitable for carrying out the present invention. Such mills may be designated as celluloid rolls, rubber rolls or mixers, masticators, etc. In adopting any such, or other plastic milling equipment to the carrying out of the present invention, certain precautions should be taken where nitrocellulose is used to reduce the fire or explosion hazard due to static, excessive speed of mill and heat. The heat from the rolls and the tremendous pressure exerted by the rolls on the plastic mass being thus treated function to force the dye or tinting agent into intimate contact with the particles of pigment with the result that apparently the dye or tinting agent becomes adsorbed on the surfaces of the pigment particles and/or is forced into the pores of the pigment particles.

The dye or tinting agent may be incorporated in or fixed upon the particles of pigment to such an extent that, when lacquer enamel produced in accordance with the method of my invention is precipitated with a substance which is a solvent for the dye and a non-solvent for the cellulose ester such, for example, as toluol, the supernatant liquid may be clear and show substantially no evidence of the presence of the dye or tinting agent. Precipitation of an enamel made from the same formula according to the heretofore customary practices invariably results in the production of a supernatant liquid showing tinting or coloring typical of the dye or tinting agent employed.

The black stock resulting from the milling of the plastic mass may be cut in a suitable formulæ to produce the desired lacquer enamel.

If the black stock is to be stored for some time before using and when a volatile liquid like alcohol remains in the stock, caking may be prevented and the proportion of film forming ingredients may be kept substantially constant by drying the stock and thus removing such volatile liquids.

In practicing my invention, I have found that after selecting the grade of carbonaceous pigment to be used in the lacquer enamel, it is advisable to actually run experimental batches of this improved black lacquer enamel to determine the approximate amount of dye or tinting agent necessary to satisfy the absorptive or other physical properties of the carbonaceous pigment during the milling operation. An excessive amount of dye or other black tinting agent simply results in a waste of such agents, and possibly in causing the lacquer to bleed without any appreciable increase in blackness, whereas the use of a smaller amount of dye or black tinting agent than that demanded by the particular pigment being used simply means that the maximum blackness obtainable will not be reached. In some cases, the use of excessive amounts of dyes has actually resulted in the production of lacquers of decreased degrees of blackness.

The following formulæ illustrate dye or tinting agent bases or solutions which may be employed satisfactorily in producing lacquer enamels in accordance with the method of my invention:

Base No. 1

| | Pounds |
|---|---|
| Induline base | 10 |
| Oleic acid | 10 |
| Solvent naphtha | 5 |

The induline base and oleic acid should be heated for a period of about 45 minutes at a temperature of about 300° F. in order to obtain a solution before the solvent naphtha is added.

Base No. 2

| | Pounds |
|---|---|
| Nigrosine base | 10 |
| Oleic acid | 10 |
| Solvent naphtha | 5 |

A solution should be formed by heating the nigrosine base with the oleic acid before the solvent naphtha is added. A satisfactory solution may be formed by heating the nigrosine base with the oleic acid for a period of about 45 minutes at a temperature of about 300° F.

Base No. 3

| | Pounds |
|---|---|
| Bone pitch (melting point 200–225° F.) | 10 |
| Oleic acid | 10 |
| Dibutyl phthalate | 5 |

A satisfactory solution may be produced by heating for a period of about 30 minutes at a temperature of about 300° F.

When dyestuffs or tinting agents are high in inorganic salts or other insoluble impurities, such impurities may be removed by common means as filter pressing, settling, etc.

Dye or tinting agent bases which may be employed to produce results similar to those which may be produced in employing bases Nos. 1, 2 and 3 described above may be purchased in the open market. Thus, the product marketed as Special Toning Black No. A-2712 by Harmon Color Works and the product marketed as Liquid Oil Black No. 51,812 by National Aniline and Chemical Co. are suitable dye or tinting agent bases.

Any suitable solvents or plasticizers may be employed for producing the dye or tinting agent bases or solutions. Thus, dibutyl phthalate or tricresyl phosphate may be substituted for the oleic acid in Bases No. 1 and No. 2, and dibutyl phthalate or camphor may be substituted for the oleic acid in Base No. 3.

The dye or tinting agent base or solution may be incorporated in a formula of the following type to form a mass or mixture for subsequent treatment on celluloid rolls to produce black stock:

| | Pounds |
|---|---|
| R. S. ½ second nitrocellulose (30% alcohol) | 220 |
| Carbon black (good grade) | 30 |
| Base No. 1, No. 2 or No. 3 | 30 |
| Dibutyl phthalate | 35 |
| Ethyl alcohol (denatured) | 27 |

The dye or tinting agent base or solution should be cut in the dibutyl phthalate and alcohol before being added to the batch. The batch may be mixed in any suitable manner as, for example, in a copper tumbling barrel until a substantially homogeneous mixture is formed. When thorough mixing has been accomplished, the mass should be transferred to the plastic milling machine and treated until the pigment is finely divided and throughly dispersed through the mass. The resulting black stock may be cut in a suitable formula to produce the desired lacquer enamel, or dried and stored for future use as desired.

In the production of black stock, according to the above formulæ, the amounts of alcohol and dibutyl phthalate employed should be regulated to some extent in accordance with certain physical properties of the pigment such as absorptive properties, denseness of the pigment, etc. The weight of the dye base may also be varied as has been previously explained; and it will be understood that, in the above formulæ, the proportions of each ingredient may be varied to a considerable extent. For instance, the liquid media and carbon black could be increased so as to obtain a final milled stock with a higher concentration of pigment. However, such a change obviously should not be carried to the point where the benefit that might be derived from handling a more highly pigmented stock would be more than offset by the extra labor that might be involved in the milling operation.

Black stock produced in accordance with the above formula and mode of treatment may be employed in a formula of the following type to produce black lacquer enamel:

|  | Pounds | Gallons at 70° F. |
|---|---|---|
| Black stock (direct from rolls) | 1,150 |  |
| R. S. ½ sec. nitrocellulose | 850 |  |
| 15–20 sec. nitrocellulose | 50 |  |
| Ester gum | 150 |  |
| Toluol |  | 400 |
| Butyl acetate |  | 130 |
| Ethyl acetate |  | 130 |
| Butanol |  | 50 |
| Blown castor oil |  | 35 |
| Dibutyl phthalate |  | 15 |
| Dewaxed Dammar Sol. (44 percent solids) |  | 55 |

The blackness of the final product may be varied by varying the relative amounts of black stock and nitrocellulose employed. A finished lacquer enamel produced in accordance with the above formula dries to a very high gloss, has a viscosity of about 200–210 sec. at 70° F. (No. 4 Ford Cup), weighs about 7.95 pounds per gallon and contains about 28.5% solids.

I claim:

1. In a process for producing a black lacquer enamel involving the incorporation of black stock in a suitable solvent, the improvement which comprises employing black stock formed by milling a mixture comprising an insoluble black pigment, a cellulose ester, a medium capable of rendering the cellulose ester plastic, and an agent soluble in said medium and capable of functioning during the milling operation to so alter the physical characteristics of the pigment as to cause it to be maintained substantially uniformly dispersed in the lacquer enamel produced, thereby to form a substantially non-settling product of improved blackness.

2. In a process for producing black lacquer enamel involving the plastic milling of a mixture comprising a cellulose derivative, a medium capable of rendering the cellulose derivative plastic and an insoluble black carbonaceous pigment, the improvement which comprises subjecting the mixture to the action of a black dye or tinting agent in solution during the course of the milling treatment.

3. In a process for producing black lacquer enamel involving the plastic milling of a mixture comprising nitrocellulose, a medium capable of rendering the nitrocellulose plastic and an insoluble black carbonaceous pigment, the improvement which comprises subjecting the mixture to the action of a black dye or tinting agent in solution during the course of the milling treatment.

4. In a process for producing black lacquer enamel involving the plastic milling of a mixture comprising nitrocellulose, a medium capable of rendering the nitrocellulose plastic and carbon black, the improvement which comprises subjecting the mixture to the action of a black dye or tinting agent in solution during the course of the milling treatment.

5. The method of producing black lacquer enamel which comprises forming a composition of matter suitable for plastic milling comprising a cellulose ester, a medium capable of rendering the cellulose ester plastic, a black dye or tinting agent capable of being put into solution in said medium, and a solid black carbonaceous pigment, subjecting the composition to a plastic milling operation, and utilizing the resulting product in the production of a black lacquer enamel.

6. The method of producing black lacquer enamel which comprises forming a composition of matter suitable for plastic milling comprising a cellulose ester, a medium capable of rendering the cellulose ester plastic, a black dye or tinting agent capable of being put into solution in said medium, and carbon black, subjecting the composition to a plastic milling operation, and utilizing the resulting product in the production of a black lacquer enamel.

7. The method of producing black lacquer enamel which comprises forming a composition of matter suitable for plastic milling comprising a cellulose ester, a medium capable of rendering the cellulose ester plastic, carbon black and a black dye or tinting agent of the group consisting of induline base, nigrosine base and bone pitch, subjecting the composition to a plastic milling operation, and utilizing the resulting product in the production of a black lacquer enamel.

8. The method of producing black lacquer enamel which comprises forming a composition of matter suitable for plastic milling comprising nitrocellulose, a medium capable of rendering the nitrocellulose plastic, a black dye or tinting agent capable of being put into solution in said medium, and carbon black, subjecting the composition to a plastic milling operation, and utilizing the resulting product in the production of a black lacquer enamel.

9. The method of producing black lacquer enamel which comprises forming a composition of matter suitable for plastic milling comprising nitrocellulose, a medium capable of rendering the nitrocellulose plastic, a solid black carbonaceous pigment and a black dye or tinting agent of the group consisting of induline base, nigrosine base and bone pitch, subjecting the composition to a plastic milling operation, and utilizing the resulting product in the production of a black lacquer enamel.

10. A black lacquer enamel formed by incorporating in a suitable formula a product formed by subjecting to a plastic milling treatment a mixture comprising a cellulose ester, a medium capable of rendering the cellulose ester plastic, an insoluble black carbonaceous pigment and a black dye or tinting agent capable of being put into solution in the plasticizing medium.

11. A black lacquer enamel formed by incorporating in a suitable formula a product formed by subjecting to a plastic milling treatment a mixture comprising nitrocellulose, a medium capable of rendering the nitrocellulose plastic, an insoluble black carbonaceous pigment and a black dye or tinting agent capable of being put into solution in the plasticizing medium.

12. A black lacquer enamel formed by incorporating in a suitable formula a product formed by subjecting to a plastic milling treatment a mixture comprising nitrocellulose, a medium capable of rendering the nitrocellulose plastic, carbon black and a black dye or tinting agent capable of being put into solution in the plasticizing medium.

13. A black lacquer enamel formed by incorporating in a suitable formula a product formed by subjecting to a plastic milling treatment a mixture comprising nitrocellulose, a medium capable of rendering the nitrocellulose plastic, carbon black and a black dye or tinting agent capable of being put into solution in the plasticizing medium of the group consisting of induline base, nigrosine base and bone pitch.

14. Black lacquer enamel stock which when added to a lacquer vehicle will give a lacquer having improved blackness and which is formed by subjecting to a plastic milling treatment a mixture comprising a cellulose derivative, a medium capable of rendering the cellulose derivative plastic, an insoluble black carbonaceous pigment and a soluble black dye or tinting agent.

15. Black lacquer enamel stock which when added to a lacquer vehicle will give a lacquer having improved blackness and which is formed by subjecting to a plastic milling treatment a mixture comprising nitrocellulose, a medium capable of rendering the nitrocellulose plastic, an insoluble black carbonaceous pigment and a black dye or tinting agent capable of being put into solution in the plasticizing medium.

16. Black lacquer enamel stock which when added to a lacquer vehicle will give a lacquer having improved blackness and which is formed by subjecting to a plastic milling treatment a mixture comprising nitrocellulose, a medium capable of rendering the nitrocellulose plastic, carbon black and a black dye or tinting agent capable of being put into solution in the plasticizing medium.

17. Black lacquer enamel stock which when added to a lacquer vehicle will give a lacquer having improved blackness and which is formed by subjecting to a plastic milling treatment a mixture comprising nitrocellulose, a medium capable of rendering the nitrocellulose plastic, carbon black and a black dye or tinting agent capable of being put into solution in the plasticizing medium of the group consisting of induline base, nigrosine base and bone pitch.

HENRY W. BATTLE, Jr.